United States Patent
Benouali et al.

(10) Patent No.: US 12,172,489 B2
(45) Date of Patent: Dec. 24, 2024

(54) MONOBLOCK HEAT EXCHANGER COMPRISING AT LEAST TWO HEAT EXCHANGE BLOCKS, EACH COMPRISING A CIRCULATION PATH FOR A REFRIGERANT AND A CIRCULATION PATH FOR A HEAT TRANSFER LIQUID

(71) Applicant: Valeo Systemes Thermiques, Le Mesnil Saint-Denis (FR)

(72) Inventors: Jugurtha Benouali, Le Mesnil Saint-Denis (FR); Christophe Denoual, La Suze sur Sarthe (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 373 days.

(21) Appl. No.: 17/612,393

(22) PCT Filed: May 18, 2020

(86) PCT No.: PCT/EP2020/063758
§ 371 (c)(1),
(2) Date: Nov. 18, 2021

(87) PCT Pub. No.: WO2020/234212
PCT Pub. Date: Nov. 26, 2020

(65) Prior Publication Data
US 2022/0219505 A1     Jul. 14, 2022

(30) Foreign Application Priority Data
May 21, 2019   (FR) ..................................... 1905304

(51) Int. Cl.
*B60H 1/00*     (2006.01)
*B60K 1/00*     (2006.01)
(Continued)

(52) U.S. Cl.
CPC .......... *B60H 1/00278* (2013.01); *B60K 11/02* (2013.01); *F28D 9/005* (2013.01);
(Continued)

(58) Field of Classification Search
CPC ...... B60H 1/00278; B60H 2001/00307; B60H 2001/00928; B60K 11/02;
(Continued)

(56) References Cited

U.S. PATENT DOCUMENTS

2012/0234523 A1*  9/2012  Jouanny ................ F28F 9/0246
                                                   165/166
2020/0006822 A1*  1/2020  Shisler .................... F28D 9/005
(Continued)

FOREIGN PATENT DOCUMENTS

DE   112013000832 T5   10/2014
DE   112016003562 T5   4/2018
(Continued)

OTHER PUBLICATIONS

International Search Report with Written Opinion in corresponding International Application No. PCT/EP2020/063758, mailed Aug. 20, 2020 (11 pages).
(Continued)

*Primary Examiner* — Henry T Crenshaw
*Assistant Examiner* — Kamran Tavakoldavani
(74) *Attorney, Agent, or Firm* — Osha Bergman Watanabe & Burton LLP

(57) ABSTRACT

The present invention relates to a refrigerant/heat transfer liquid heat exchanger (11), in which said refrigerant/heat transfer liquid heat exchanger is a monoblock refrigerant/heat transfer liquid heat exchanger (11). The refrigerant/heat transfer liquid heat exchanger (11) comprises at least two heat exchange blocks (41, 42) which are sealed with respect to one another, including a first heat exchange block (41)

(Continued)

having a first circulation path for a refrigerant (21a) and a first circulation path for a heat transfer liquid (22a) and a second heat exchange block (42) having a second circulation path for a refrigerant (21b) and a second circulation path for a heat transfer liquid (22b). The heat exchange blocks (41, 42) are joined via a partition plate (40).

10 Claims, 11 Drawing Sheets

(51) Int. Cl.
*B60K 11/02* (2006.01)
*F28D 9/00* (2006.01)
*F28D 21/00* (2006.01)

(52) U.S. Cl.
CPC ............ *B60H 2001/00307* (2013.01); *B60H 2001/00928* (2013.01); *B60K 2001/005* (2013.01); *F28D 2021/0031* (2013.01); *F28F 2275/04* (2013.01)

(58) Field of Classification Search
CPC ............... B60K 2001/005; F28D 9/005; F28D 2021/0031; F28F 2275/04
See application file for complete search history.

(56) References Cited

U.S. PATENT DOCUMENTS

2020/0173736 A1* 6/2020 Dahlberg ............... F28D 9/0093
2021/0033358 A1* 2/2021 Davidkov ............... C22C 21/18

FOREIGN PATENT DOCUMENTS

| EP | 1132694 | A1 | 9/2001 |
| EP | 2420763 | A2 | 2/2012 |
| EP | 2784425 | A1 | 10/2014 |
| FR | 2989635 | A1 | 10/2013 |

OTHER PUBLICATIONS

Office Action Issued in Corresponding EP Application No. 20 729 959.5, dated Sep. 15, 2023. (4 Pages).

* cited by examiner

MONOBLOCK HEAT EXCHANGER COMPRISING AT LEAST TWO HEAT EXCHANGE BLOCKS, EACH COMPRISING A CIRCULATION PATH FOR A REFRIGERANT AND A CIRCULATION PATH FOR A HEAT TRANSFER LIQUID

The present invention relates to a refrigerant/heat transfer liquid heat exchanger. The present invention also relates to an installation comprising a refrigerant circuit, a heat transfer liquid circuit and such a refrigerant/heat transfer liquid heat exchanger. The present invention also relates to a method for cooling an electrical storage device of a motor vehicle using such an installation.

In the automotive sector, it is common to have to modify a temperature of a component such as an electric motor, a battery, a heat and/or cold storage device or similar. To this end, the motor vehicle is provided with an installation that comprises a refrigerant circuit inside which a refrigerant circulates, and a heat transfer liquid circuit inside which a heat transfer liquid circulates. The refrigerant circuit comprises a compressor for compressing the refrigerant, a thermal exchanger for cooling the refrigerant at constant pressure, an expansion member to allow the expansion of the refrigerant, and a refrigerant/heat transfer liquid heat exchanger that is arranged to allow a thermal transfer between the refrigerant and the heat transfer liquid. The heat transfer liquid circuit comprises a pump and a thermal exchanger capable of modifying a temperature of the component.

The refrigerant/heat transfer liquid heat exchanger is an exchanger comprising plates that are stacked and joined together in order to form tubes defining refrigerant circulation channels or heat transfer liquid circulation channels. The plate comprises four orifices in order to allow the intake and output of the refrigerant, and the intake and output of the heat transfer liquid into and from the circulation channels situated on either side of the same plate.

The refrigerant/heat transfer liquid heat exchanger is longitudinally bordered by a first cheek and a second cheek between which the plates are arranged. The first cheek is provided with four passages to allow the intake and output of the refrigerant, and the intake and output of the heat transfer liquid into and from the circulation channels situated on either side of the same plate. The second cheek does not have any passages.

It is common to have to cool the component according to different modes, in particular when it comprises at least one electric battery. Specifically, it is necessary to cool the electric battery when it is charging, during which the electric battery tends to heat up. The electric battery can be recharged in rapid charging mode, in which a charging time is short and an electric charging current is high, or in normal charging mode, in which the charging time is long and the electric charging current is low. Now, the heating of the electric battery is generally proportional to the electric charging current.

It is thus common to have to cool the electric battery in rapid charging mode, in which the electric battery dissipates a significant quantity of heat, requiring an equally significant cooling power supplied by the heat exchanger. It is also common to have to cool the electric battery in normal charging mode, in which the electric battery dissipates a small quantity of heat, which a considerably lower cooling power than that necessary in rapid charging mode is sufficient to dissipate.

In order to handle these two separate operating modes, the refrigerant/heat transfer liquid heat exchanger is usually configured to supply the high cooling power that is necessary when the electric battery is in rapid charging mode. In other words, the refrigerant/heat transfer liquid heat exchanger is designed and configured to supply high cooling power, corresponding to the power necessary to dissipate the heat supplied by the battery in rapid charging mode.

Paradoxically, however, it appears that a refrigerant/heat transfer liquid heat exchanger configured in this way has degraded cooling performance when the cooling power requested is low. In other words, it appears that the refrigerant/heat transfer liquid heat exchanger configured in this way cools the electric battery less well in normal charging mode than it cools this same electric battery in rapid charging mode.

One aim of the present invention is to propose a refrigerant/heat transfer liquid heat exchanger configured to efficiently and rapidly supply the appropriate cooling power as a function of various operating modes of the electric battery.

The present invention improves the situation by proposing a refrigerant/heat transfer liquid heat exchanger having the following technical features.

According to the present invention, the refrigerant/heat transfer liquid heat exchanger is a monoblock refrigerant/heat transfer liquid heat exchanger comprising at least two heat exchange blocks sealed with respect to each other, including a first heat exchange block comprising a first circulation path for a refrigerant and a first circulation path for a heat transfer liquid, and a second heat exchange block comprising a second circulation path for the refrigerant and a second circulation path for the heat transfer liquid, the heat exchange blocks being joined by means of a partition plate.

The refrigerant/heat transfer liquid heat exchanger advantageously comprises at least any one of the following technical features, alone or in combination:
- the refrigerant/heat transfer liquid heat exchanger is monoblock in the sense that the heat exchange blocks that make up the heat exchanger cannot be separated from one another without destroying one at least of the heat exchange blocks,
- the refrigerant/heat transfer liquid heat exchanger and its heat exchange blocks are integrally formed and cannot operate after any separation of the heat exchange blocks from each other,
- the partition plate fluidically isolates the first heat exchange block from the second heat exchange block,
- the heat exchange blocks are sealed from each other in the sense that no fluid, which can equally be refrigerant and/or heat transfer liquid, can travel directly from one of the heat exchange blocks to the other,
- the circulation paths for the refrigerant and the circulation paths for the heat transfer liquid are arranged so as to allow an exchange of heat between the refrigerant intended to circulate inside the circulation paths for the refrigerant and the heat transfer liquid provided to circulate inside the circulation paths for the heat transfer liquid, the circulation paths being equally housed inside the first heat exchange block or the second heat exchange block,
- a first volume of the first heat exchange block is between 50% and 70% of a total volume of the monoblock refrigerant/heat transfer liquid heat exchanger,
- a second volume of the second heat exchange block is between 30% and 50% of the total volume of the monoblock refrigerant/heat transfer liquid heat exchanger, the first heat exchange block and the second heat exchange block are butted longitudinally via the partition plate, the partition plate is equipped with centering means for centering the first heat exchange block and the second heat exchange block on the partition plate, the centering means comprise at least a plurality of bosses, the bosses equip both faces of the partition plate, each boss has an apex which is intended to be brazed onto any one of the heat exchange blocks, the partition plate is equipped with means for fixing the refrigerant/heat transfer liquid heat exchanger, the fixing means allow fixing of the refrigerant/heat transfer liquid heat exchanger on a part in its environment, the fixing means comprise at least one opening equipping a region of the partition plate overhanging any one of the flanks and/or sides of the refrigerant/heat transfer liquid heat exchanger, the refrigerant/heat transfer liquid heat exchanger extends longitudinally between a first cheek and a second cheek, the first cheek being provided with four passages, including a first passage, a second passage, a third passage and a fourth passage, and the second cheek being provided with four passages, including a fifth passage, a sixth passage, a seventh passage and an eighth passage, the first heat exchange block is bordered longitudinally on one side by the first cheek and on the other side by the partition plate, the second heat exchange block is bordered longitudinally on one side by the partition plate and on the other side by the second cheek, the first passage and the second passage constitute the first circulation path for the refrigerant, the third passage and the fourth passage constitute the first circulation path for the heat transfer liquid, the fifth passage and the sixth passage constitute the second circulation path for the refrigerant, and the seventh passage and the eighth passage constitute the second circulation path for the heat transfer liquid, the first circulation path for the refrigerant and the first circulation path for the heat transfer liquid are U-shaped, the second circulation path for the refrigerant and the second circulation path for the heat transfer liquid are U-shaped, the first passage and the fourth passage constitute the first circulation path for the refrigerant, the second passage and the third passage constitute the first circulation path for the heat transfer liquid, the fifth passage and the eighth passage constitute the second circulation path for the refrigerant, and the sixth passage and the seventh passage constitute the second circulation path for the heat transfer liquid, the first circulation path for the refrigerant and the first circulation path for the heat transfer liquid are I-shaped, the second circulation path for the refrigerant and the second circulation path for the heat transfer liquid are I-shaped, the refrigerant/heat transfer liquid heat exchanger is a plate exchanger comprising the partition plate and exchange plates which are assembled together by brazing, the first heat exchange block, the second heat exchange block and the partition plate are secured by way of a mechanical assembly means, the mechanical assembly means comprises assembly means by screwing by means of screws, nuts or the like, by clipping, by interlocking or the like, the exchange plates constituting the first heat exchange block are identical to the exchange plates constituting the second heat exchange block, the exchange plates are first-type exchange plates intended to shape the refrigerant/heat transfer liquid heat exchanger into a U-shaped heat exchanger, the exchange plates are second-type exchange plates intended to shape the refrigerant/heat transfer liquid heat exchanger into an I-shaped heat exchanger.

The present invention also relates to an installation for thermal treatment of a component equipping a motor vehicle, the installation comprising a refrigerant circuit, a heat transfer liquid circuit and such a refrigerant/heat transfer liquid heat exchanger, the refrigerant circuit comprising a first refrigerant circulation branch and a second refrigerant circulation branch that are arranged parallel to each other, the heat transfer liquid circuit comprising a first heat transfer liquid circulation branch and a second heat transfer liquid circulation branch that are arranged parallel to each other, wherein the first refrigerant circulation path constitutes the first refrigerant circulation branch, the first heat transfer liquid circulation path constitutes the first heat transfer liquid circulation branch, the second refrigerant circulation path constitutes the second refrigerant circulation branch and the second heat transfer liquid circulation path constitutes the second heat transfer liquid circulation branch, the first heat exchange block is installed on the first refrigerant circulation branch and on the first heat transfer liquid circulation branch, the second heat exchange block is installed on the second refrigerant circulation branch and on the second heat transfer liquid circulation branch, the first refrigerant circulation branch and the second refrigerant circulation branch are formed in parallel between a first point of the refrigerant circuit and a second point of the refrigerant circuit, any one at least of the first point of the refrigerant circuit and of the second point of the refrigerant circuit being equipped with a first control member for controlling a supply of refrigerant to the heat exchange blocks of the refrigerant/heat transfer liquid heat exchanger, the first control member is for example a three-way valve or any other control means allowing or preventing a supply of refrigerant to the first refrigerant circulation branch and/or to the second refrigerant circulation branch, the first heat transfer liquid circulation branch and the second heat transfer liquid circulation branch are formed in parallel between a first point of the heat transfer liquid circuit and a second point of the heat transfer liquid circuit, any one at least of the first point of the heat transfer liquid circuit and of the second point of the heat transfer liquid circuit being equipped with a second control member for controlling a supply of a heat transfer liquid to the heat exchange blocks of the refrigerant/heat transfer liquid heat exchanger, the second control member is for example a three-way valve or any other control means allowing or preventing a supply of heat transfer liquid to the first circulation branch of the heat transfer liquid and/or to the second circulation branch of the heat transfer liquid.

The present invention also relates to a method for cooling an electrical storage device of a motor vehicle by means of such an installation, wherein:

the refrigerant and the heat transfer liquid travel through the first heat exchange block and the second heat exchange block when the electrical storage device is in a rapid charging mode, and the refrigerant and the heat transfer liquid travel through only the first heat exchange block when the electrical storage device is in an intermediate charging mode, the refrigerant and the heat transfer liquid travel through only the second heat exchange block when the electrical storage device is in a normal charging mode.

The invention will be better understood on reading the following nonlimiting description, given with reference to the appended drawings, in which.

Figure 4:
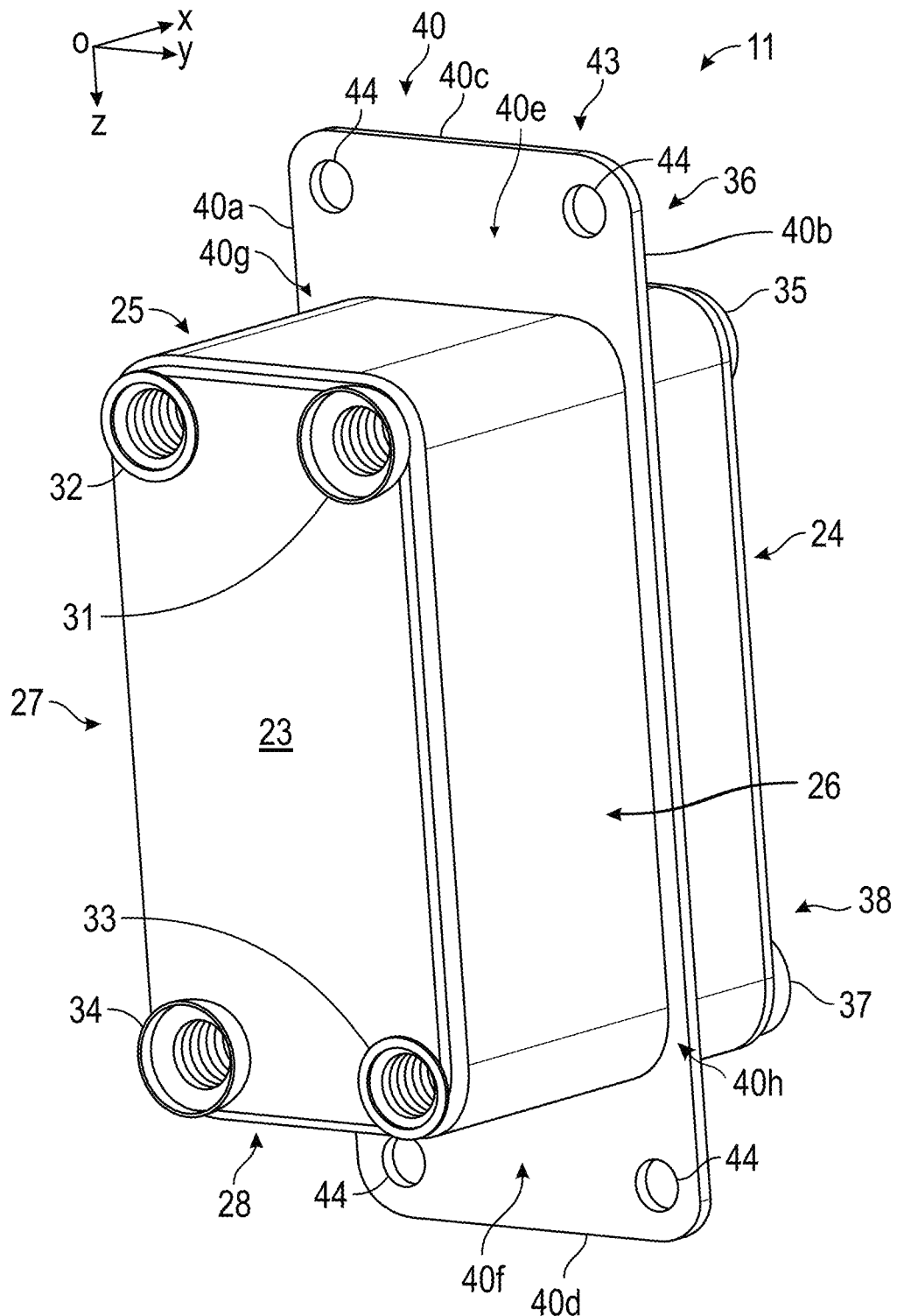
FIG. 4 shows in perspective a refrigerant/heat transfer liquid heat exchanger of the present invention which constitutes the installation illustrated in FIGS. 1 to 3.
Figure 5:
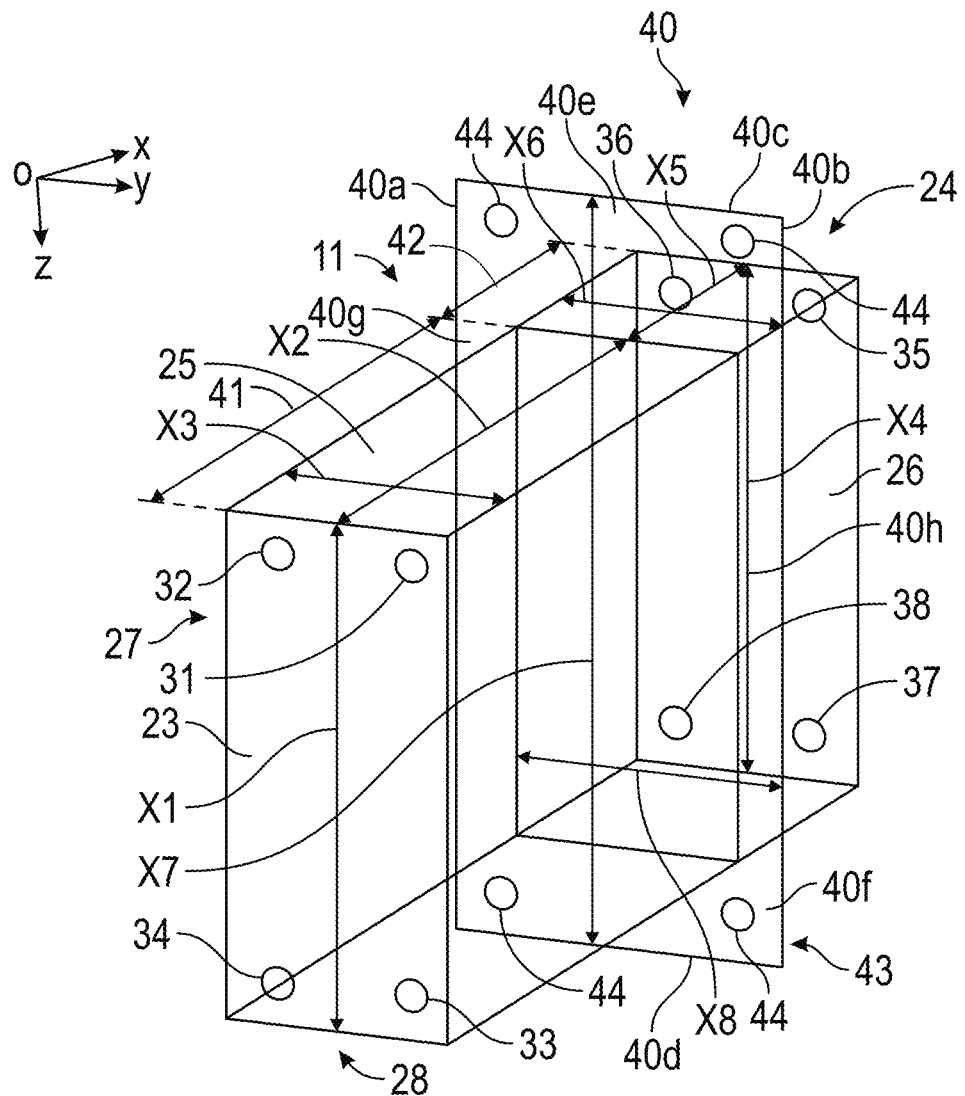

FIG. 5 schematically illustrates the refrigerant/heat transfer liquid heat exchanger shown in FIG. 4.

Figure 6:
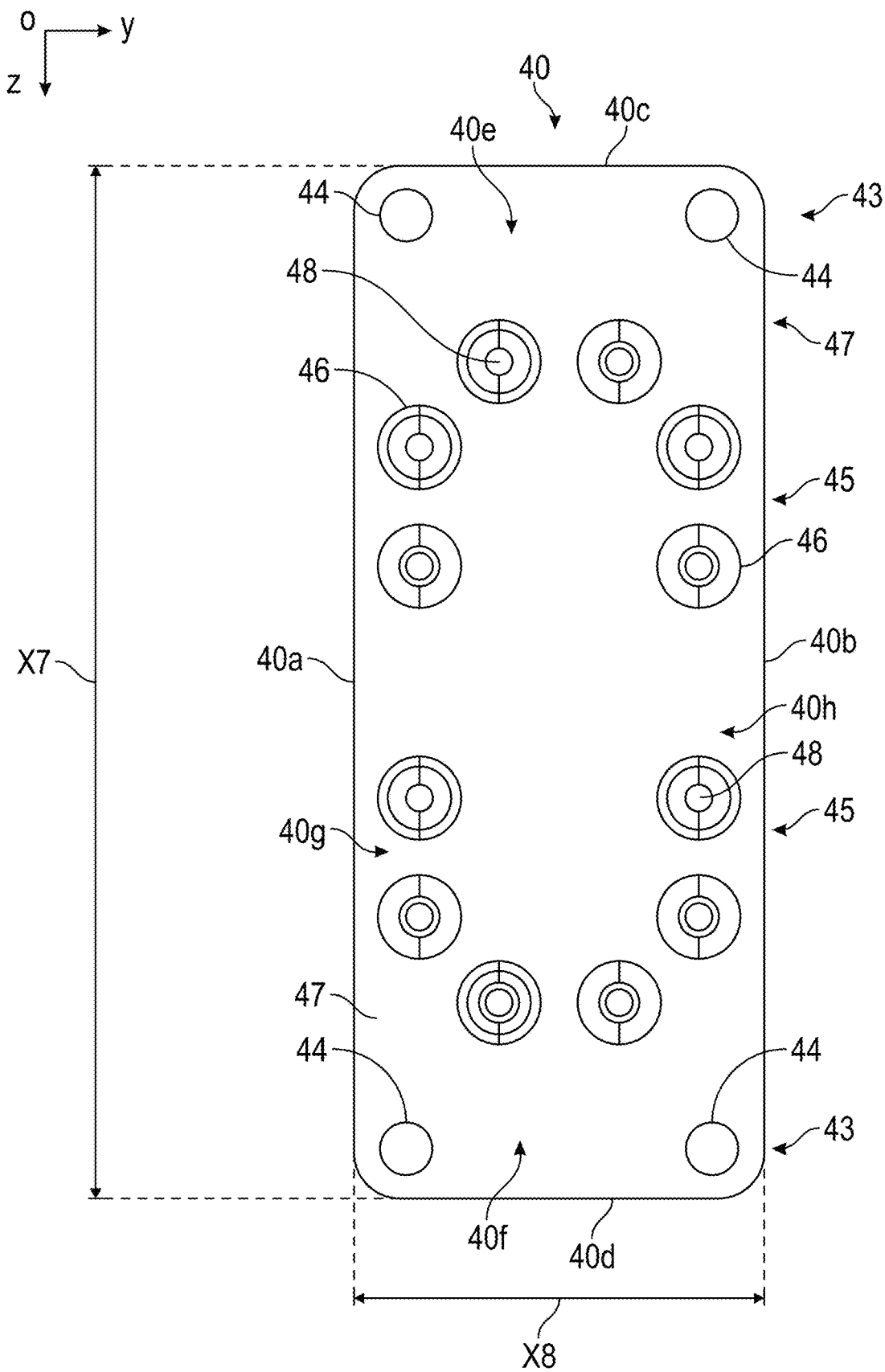

FIG. 6 shows a front view of a partition plate constituting the refrigerant/heat transfer liquid heat exchanger shown in FIGS. 4 and 5.

Figure 7:
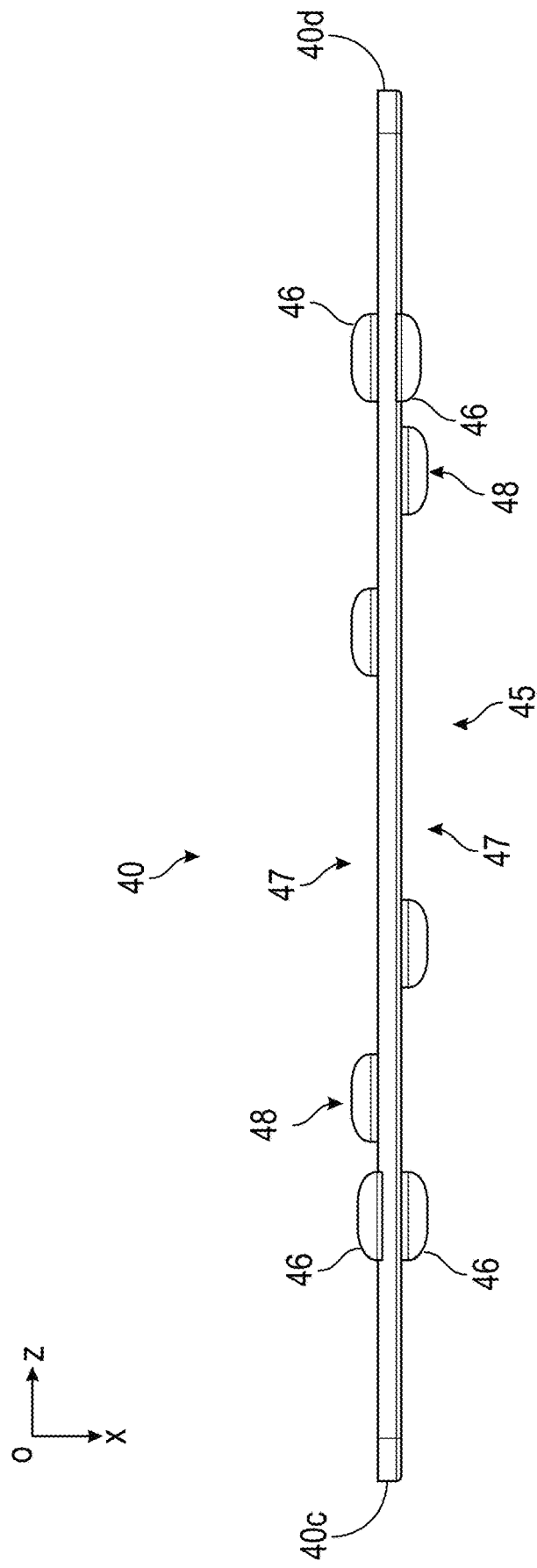

FIG. 7 shows a profile view of the partition plate shown in FIG. 6.

Figure 8:
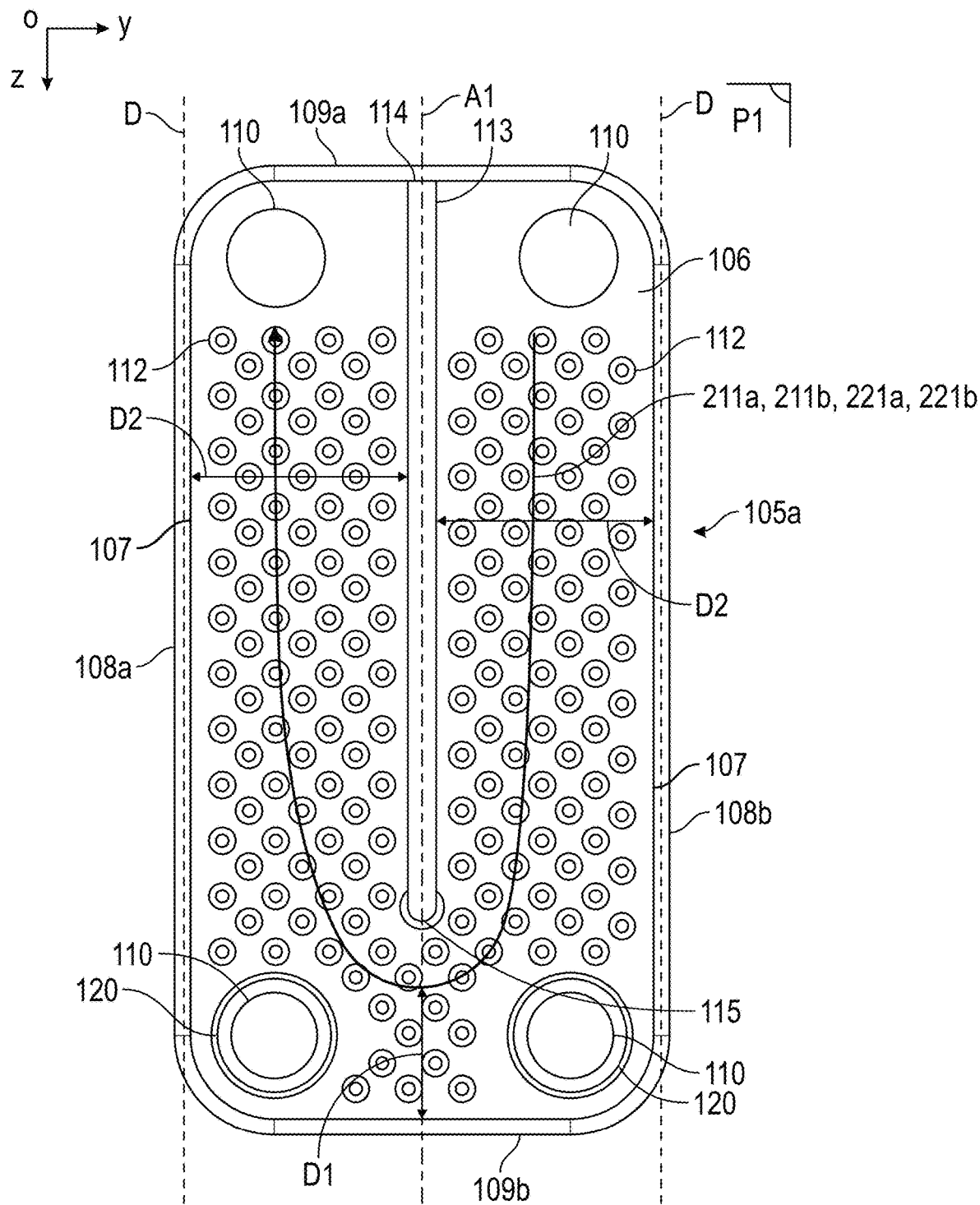

FIG. 8 schematically illustrates a first-type exchange plate constituting a first variant embodiment of the refrigerant/heat transfer liquid heat exchanger illustrated in FIGS. 4 and 5.

Figure 9:
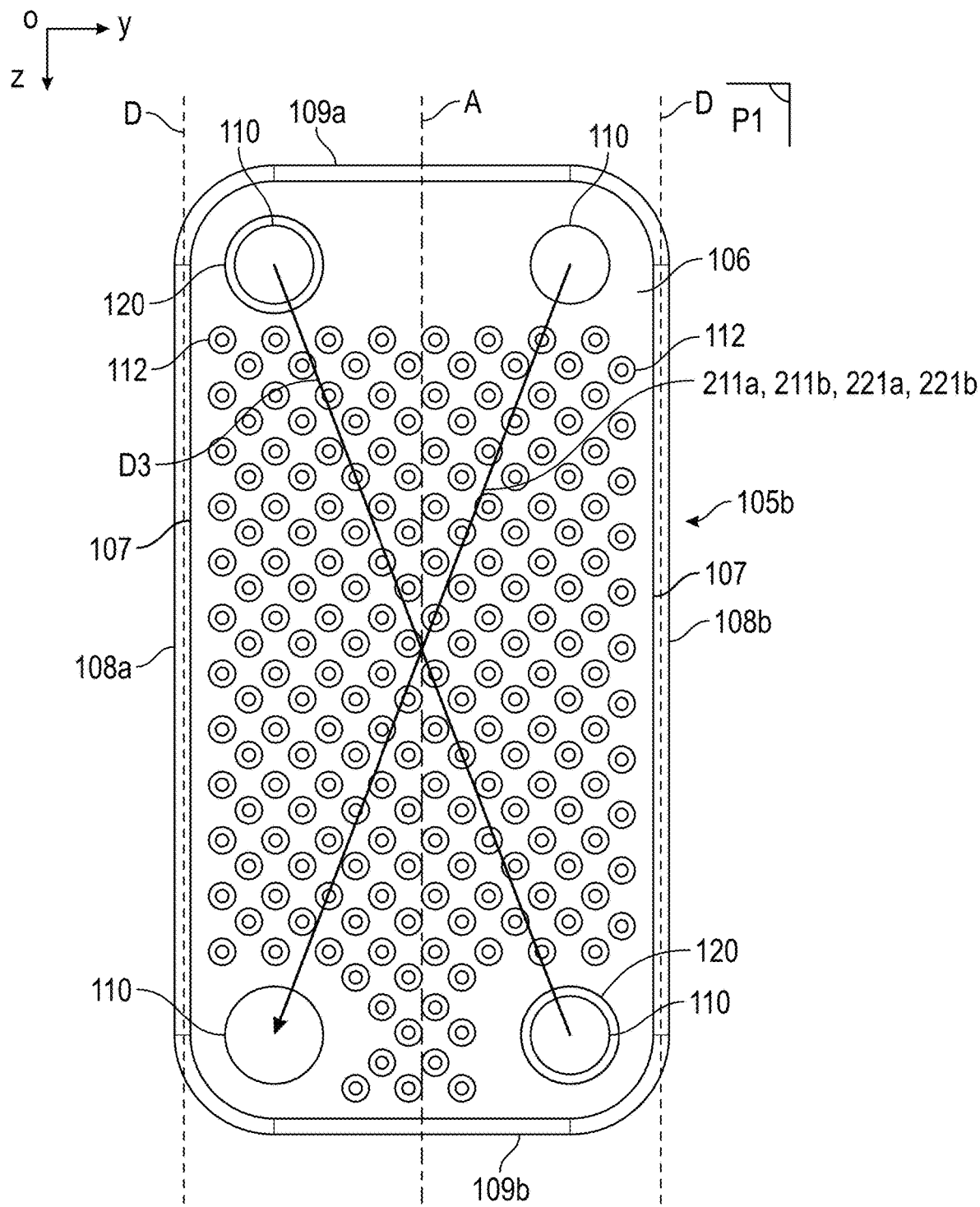

FIG. 9 schematically illustrates a second-type exchange plate constituting a second variant embodiment of the refrigerant/heat transfer liquid heat exchanger illustrated in FIGS. 4 and 5.

Figure 10:
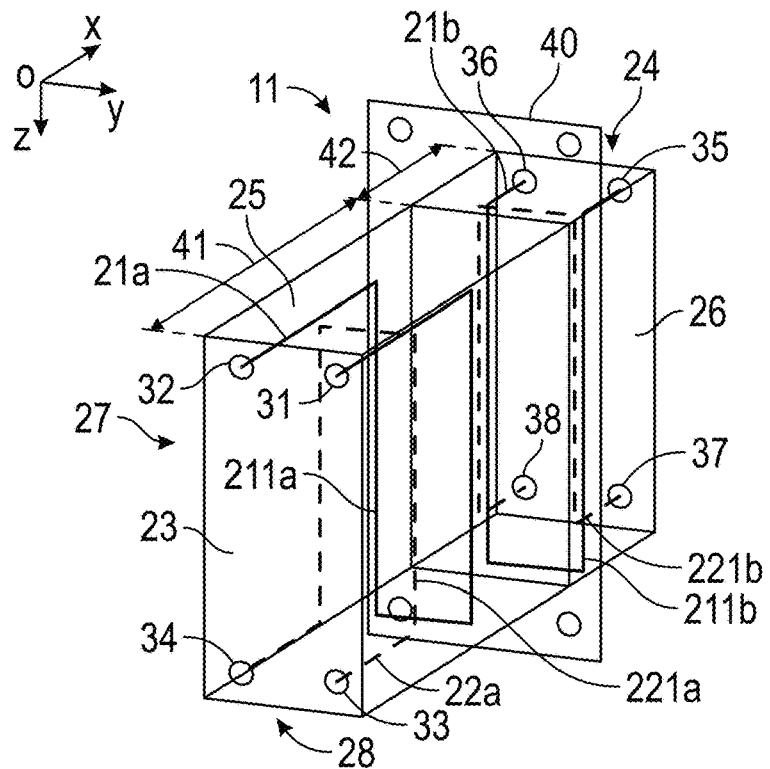

FIG. 10 schematically illustrates a refrigerant/heat transfer liquid heat exchanger made from plates illustrated in FIG. 8.

Figure 11:
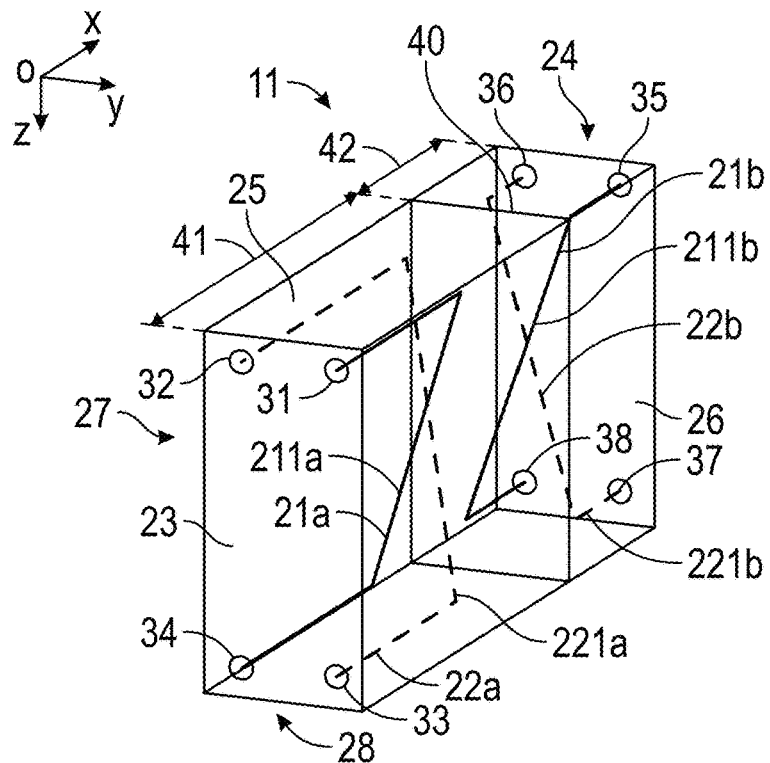

FIG. 11 schematically illustrates a refrigerant/heat transfer liquid heat exchanger made from plates illustrated in FIG. 9.

Figure 12:
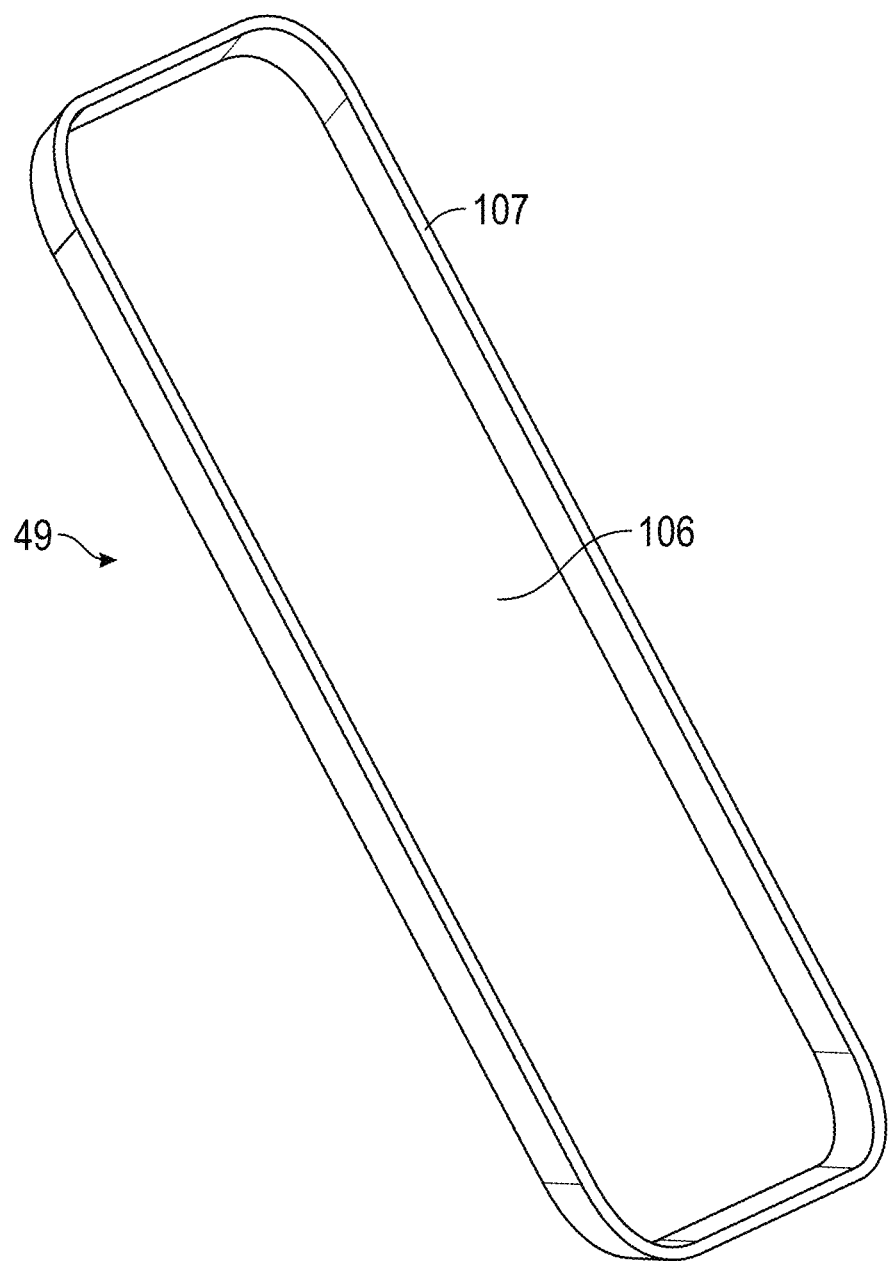

FIG. 12 schematically illustrates an end plate constituting one embodiment of the refrigerant/heat transfer liquid heat exchanger illustrated in FIG. 10 or 11.

Figure 1:
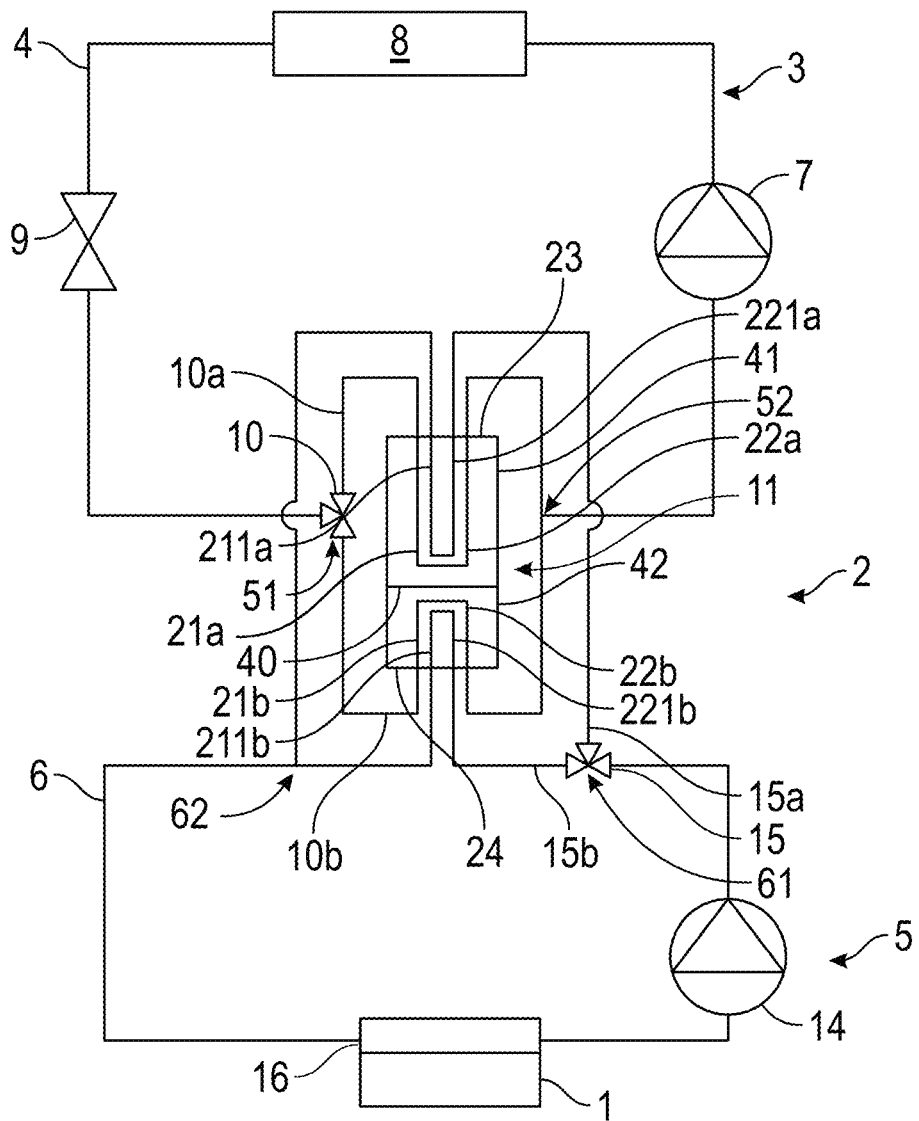
FIG. 1 shows an installation of the present invention, according to a first mode of cooling a component.
Figure 2:
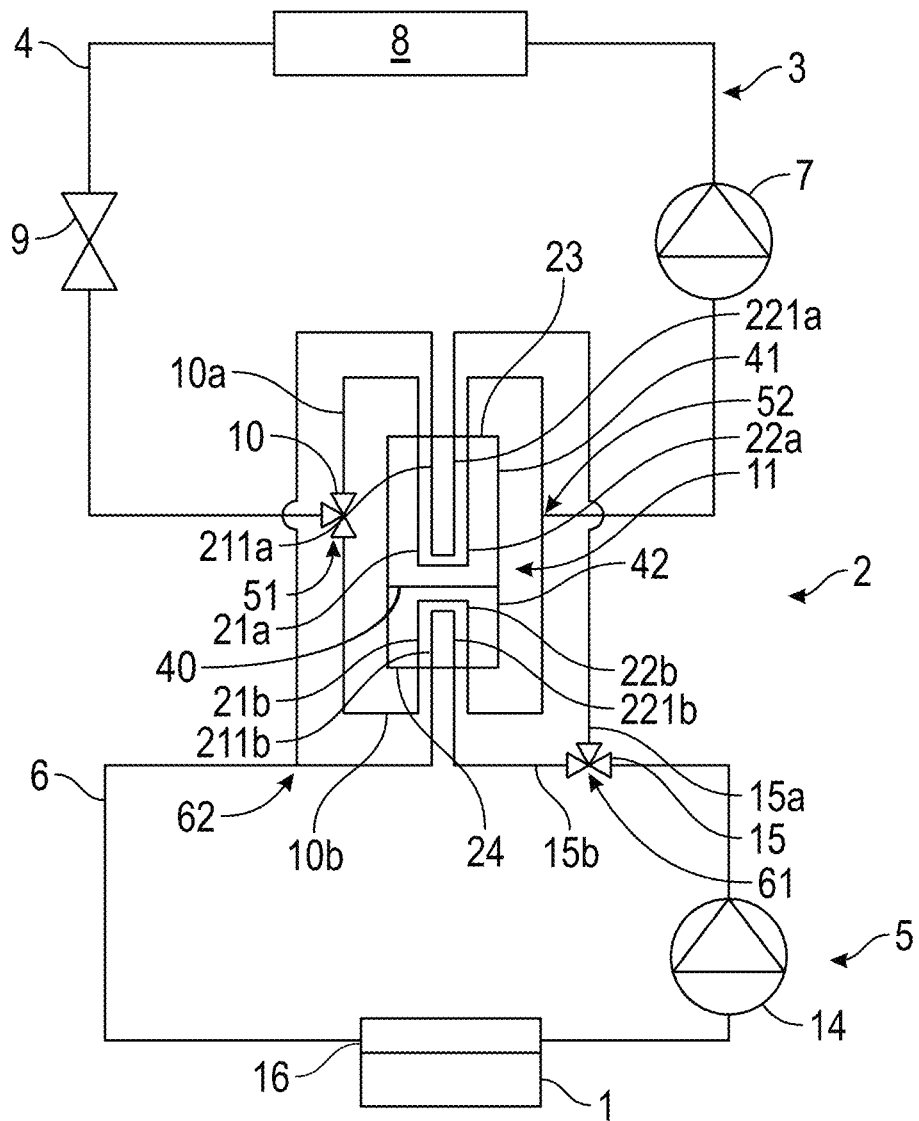
FIG. 2 shows the installation illustrated in FIG. 1, according to a second mode of cooling the component.
Figure 3:
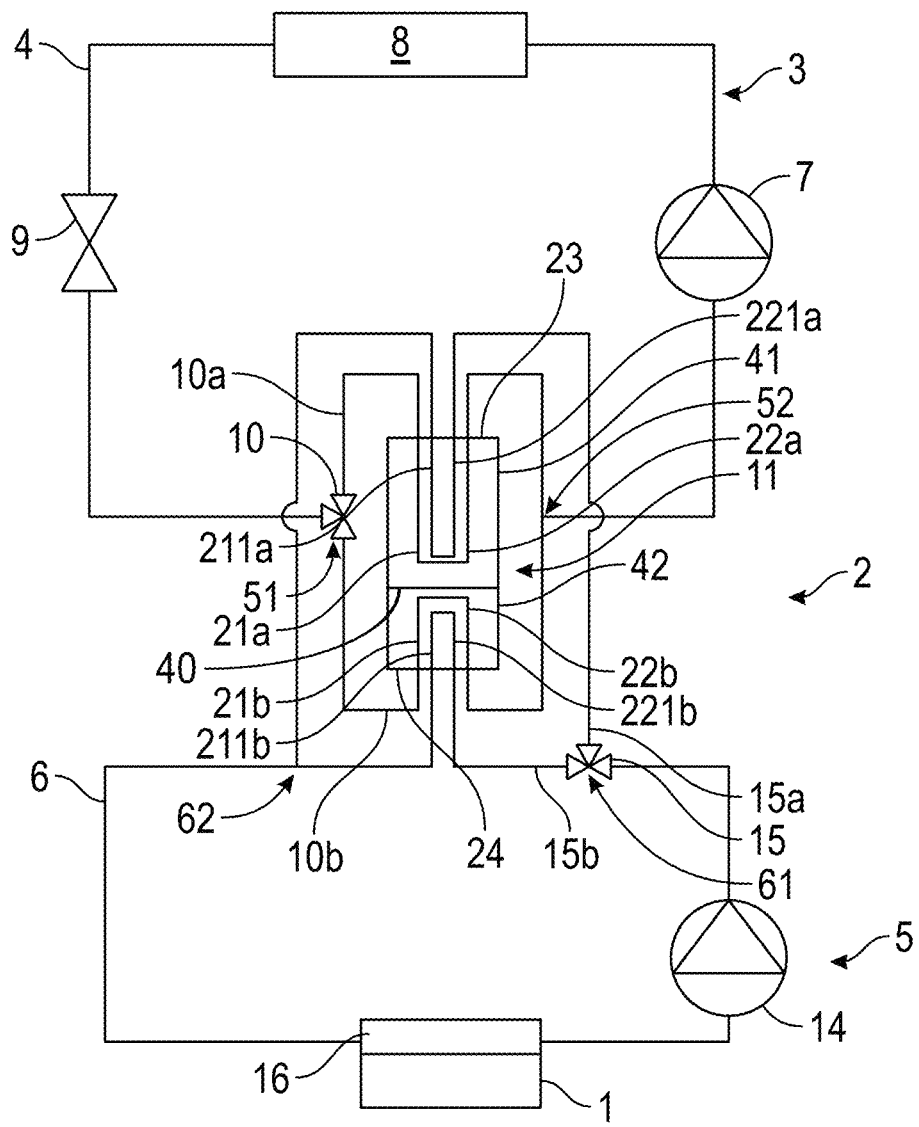
FIG. 3 shows the installation illustrated in FIGS. 1 and 2, according to a third mode of cooling the component.

In FIGS. 1 to 3, a motor vehicle is equipped with a component 1 which should be cooled or heated, for example in order to optimize the operation thereof. Such a component 1 is for example an electric motor or combustion engine intended for at least partially propelling the motor vehicle, an electrical storage device comprising at least one electric battery intended to store electrical energy, a heat and/or cold storage device or similar. The component 1 is more particularly an electrical storage device comprising at least one electric battery that can be recharged in particular in rapid charging mode, in which a charging time is short and an electric charging current is high, or in normal charging mode, in which the charging time is long and the electric charging current is low. The present invention aims to efficiently cool the electric battery, regardless of its charging mode: rapid charging mode in which the electric battery heats up rapidly and significantly, as shown in FIG. 1, normal charging mode in which the electric battery heats up slowly and slightly, as shown in FIG. 2, or intermediate charging mode in which the battery heats up moderately, in particular more than in normal charging mode and less than in rapid charging mode, as shown in FIG. 3.

To this end, the motor vehicle is equipped with an installation 2 that comprises a refrigerant circuit 3 inside which a refrigerant 4 circulates, for example carbon dioxide or similar, and a heat transfer liquid circuit 5 inside which a heat transfer liquid 6 circulates, in particular glycol water or similar. The installation 2 is configured to modify a temperature of component 1, and in particular to cool the component 1.

The installation 2 comprises at least one refrigerant/heat transfer liquid heat exchanger 11 according to the present invention. The installation 2 is described below in order to better understand the present invention, but the features of the installation 2 described do not in any way limit the refrigerant/heat transfer liquid heat exchanger 11 of the present invention. In other words, the installation 2 is able to have distinct structural features and/or operating modes different from those described, without the refrigerant/heat transfer liquid heat exchanger 11 departing from the rules of the present invention.

The refrigerant circuit 3 successively comprises a compressor 7 for compressing the refrigerant 4, a refrigerant/external air exchanger 8 for cooling the refrigerant 4 at constant pressure, for example placed on the front face of the motor vehicle, an expansion member 9 to allow the expansion of the refrigerant 4, a first member 10 for controlling a supply of refrigerant 4 to the refrigerant/heat transfer liquid heat exchanger 11 and the refrigerant/heat transfer liquid heat exchanger 11, which is designed to allow a thermal transfer between the refrigerant 4 and the heat transfer liquid 6.

The first control member 10 is capable of directing the refrigerant 4 coming from the expansion member 9 toward at least any one of a first refrigerant circulation branch 10a and a second refrigerant circulation branch 10b which the refrigerant circuit 3 comprises, the first refrigerant circulation branch 10a and the second refrigerant circulation branch 10b being arranged parallel to each other. The first refrigerant circulation branch 10a and the second refrigerant circulation branch 10b are formed in parallel between a first point of the refrigerant circuit 51 and a second point of the refrigerant circuit 52. The first point of the refrigerant circuit 51 is situated between the expansion member 9 and the refrigerant/heat transfer liquid heat exchanger 11, while the second point of the refrigerant circuit 52 is placed between the refrigerant/heat transfer liquid heat exchanger 11 and the compressor 7.

The first point of the refrigerant circuit 51 is equipped with the first member 10 for controlling the supply of refrigerant 4 to the refrigerant/heat transfer liquid heat exchanger 11. According to another variant, the second point of the refrigerant circuit 52 is equipped with the first member 10 for controlling the supply of refrigerant 4 to the refrigerant/heat transfer liquid heat exchanger 11. The refrigerant/heat transfer liquid heat exchanger 11 constitutes the first refrigerant circulation branch 10a and the second refrigerant circulation branch 10b.

The first control member 10 comprises, for example, a three-way valve or any other control means permitting or prohibiting the supply of refrigerant 4 to the first refrigerant circulation branch 10a and/or to the second refrigerant circulation branch 10b.

The heat transfer liquid circuit 5 successively comprises a pump 14 to cause the heat transfer liquid 6 to circulate inside the heat transfer liquid circuit 5, a second member 15 for controlling the supply of heat transfer liquid 6 to the refrigerant/heat transfer liquid heat exchanger 11, the refrigerant/heat transfer liquid heat exchanger 11 which also constitutes the refrigerant circuit 3, and a thermal exchanger 16, the thermal exchanger 16 being capable of modifying a temperature of the component 1, in particular by direct contact formed between the component 1 and the thermal exchanger 16.

The second control member 15 is capable of directing the heat transfer liquid 6 coming from the pump 14 toward at least any one of a first heat transfer liquid circulation branch 15*a* and a second heat transfer liquid circulation branch 15*b* which the heat transfer liquid circuit 5 comprises, the first heat transfer liquid circulation branch 15*a* and the second heat transfer liquid circulation branch 15*b* being arranged parallel to each other. The first heat transfer liquid circulation branch 15*a* and the second heat transfer liquid circulation branch 15*b* are formed in parallel between a first point of the heat transfer liquid circuit 61 and a second point of the heat transfer liquid circuit 62. The first point of the heat transfer liquid circuit 61 is situated between pump 14 and the refrigerant/heat transfer liquid heat exchanger 11, while the second point of the heat transfer liquid circuit 62 is placed between the refrigerant/heat transfer liquid heat exchanger 11 and the thermal exchanger 16.

The first point of the heat transfer liquid circuit 61 is equipped with the second member 15 for controlling a supply of heat transfer liquid 6 to the refrigerant/heat transfer liquid heat exchanger 11. According to another variant, the second point of the heat transfer liquid circuit 62 is equipped with the second member 15 for controlling a supply of heat transfer liquid 6 to the refrigerant/heat transfer liquid heat exchanger 11. The refrigerant/heat transfer liquid heat exchanger 11 constitutes the first heat transfer liquid circulation branch 15*a* and the second heat transfer liquid circulation branch 15*b*.

The second control member 15 comprises, for example, a three-way valve or any other control means permitting or prohibiting the supply of heat transfer liquid 6 to the first heat transfer liquid circulation branch 15*a* and/or to the second heat transfer liquid circulation branch 15*b*.

In order to constitute the first refrigerant circulation branch 10*a* and the second refrigerant circulation branch 10*b* as well as the first heat transfer liquid circulation branch 15*a* and the second heat transfer liquid circulation branch 15*b*, the refrigerant/heat transfer liquid heat exchanger 11 has a particular structure and layout.

Specifically, the refrigerant/heat transfer liquid heat exchanger 11 comprises at least two refrigerant circulation paths 21*a*, 21*b* and at least two heat transfer liquid circulation paths 22*a*, 22*b*.

More particularly, the refrigerant/heat transfer liquid heat exchanger 11 comprises at least a first refrigerant circulation path 21*a* and a second refrigerant circulation path 21*b*. The first refrigerant circulation path 21*a* and the second refrigerant circulation path 21*b* are arranged parallel to each other inside the refrigerant/heat transfer liquid heat exchanger 11. The first refrigerant circulation path 21*a* thus forms an integral part of the first refrigerant circulation branch 10*a* and the second refrigerant circulation path 21*b* forms an integral part of the second refrigerant circulation branch 10*b*.

Likewise, the refrigerant/heat transfer liquid heat exchanger 11 comprises at least a first heat transfer liquid circulation path 22*a* and a second heat transfer liquid circulation path 22*b*. The first heat transfer liquid circulation path 22*a* and the second heat transfer liquid circulation path 22*b* are arranged parallel to each other inside the refrigerant/heat transfer liquid heat exchanger 11. The first heat transfer liquid circulation path 22*a* thus forms an integral part of the first heat transfer liquid circulation branch 15*a* and the second heat transfer liquid circulation path 22*b* forms an integral part of the second heat transfer liquid circulation branch 15*b*.

The first refrigerant circulation path 21*a* and the first heat transfer liquid circulation path 22*a* are arranged so that the refrigerant 4 present inside the first refrigerant circulation path 21*a* exchanges heat energy with the heat transfer liquid 6 present inside the first heat transfer liquid circulation path 22*a*.

Likewise, the second refrigerant circulation path 21*b* and the second heat transfer liquid circulation path 22*b* are arranged so that the refrigerant 4 present inside the second refrigerant circulation path 21*b* exchanges heat energy with the heat transfer liquid 6 present inside the second heat transfer liquid circulation path 22*b*.

Preferably, the first refrigerant circulation path 21*a* comprises a plurality of first refrigerant circulation channels 211*a* and the first heat transfer liquid circulation path 22*a* comprises a plurality of first heat transfer liquid circulation channels 221*a*, a first refrigerant circulation channel 211*a* being interposed between two first heat transfer liquid circulation channels 221*a* and a first heat transfer liquid circulation channel 221*a* being interposed between two first refrigerant circulation channels 211*a*.

Preferably, the second refrigerant circulation path 21*b* comprises a plurality of second refrigerant circulation channels 211*b* and the second heat transfer liquid circulation path 22*b* comprises a plurality of second heat transfer liquid circulation channels 221*b*, a second refrigerant circulation channel 211*b* being interposed between two second heat transfer liquid circulation channels 221*b* and a second heat transfer liquid circulation channel 221*b* being interposed between two second refrigerant circulation channels 211*b*.

The refrigerant/heat transfer liquid heat exchanger 11 is an exchanger which comprises a first heat exchange block 41 extending between a first cheek 23 and a partition plate 40 and a second heat exchange block 42 which extends between the partition plate 40 and a second cheek 24. In other words, the refrigerant/heat transfer liquid heat exchanger 11 is formed of two heat exchange blocks 41, 42 which are sealed with each other and which are separated and fluidically isolated from one another by the partition plate 40.

The first heat exchange block 41 houses the first refrigerant circulation path 21*a* and the first heat transfer liquid circulation path 22*a*, while the second heat exchange block 42 houses the second refrigerant circulation path 21*b* and the second heat transfer liquid circulation path 22*b*. It is understood in this that the first refrigerant circulation path 21*a* and the first heat transfer liquid circulation path 22*a* are situated on one side of the partition plate 40 and that the second refrigerant circulation path 21*b* and the second heat transfer liquid circulation path 22*b* are situated on the other side of the partition plate 40.

The refrigerant/heat transfer liquid heat exchanger 11 is a monoblock heat exchanger in the sense that the heat exchange blocks 41, 42 constituting the refrigerant/heat transfer liquid heat exchanger 11 can be separated from one another only by a dislocation and/or destruction of at least one of the heat exchange blocks 41, 42.

According to a variant embodiment, the first heat exchange block 41 represents by volume two thirds, to within 10%, of a total volume of the refrigerant/heat transfer liquid heat exchanger 11, while the second heat exchange block 42 represents by volume one third, to within 10%, of the total volume of the refrigerant/heat transfer liquid 11 heat exchanger.

In FIG. 1, the component 1 is in rapid charging mode and requires significant cooling power. The first control member 10 thus permits the circulation of the refrigerant 4 toward the first refrigerant circulation branch 10a and toward the second refrigerant circulation branch 10b, so that the refrigerant 4 travels through the entire volume of the refrigerant/heat transfer liquid heat exchanger 11. Likewise, the second control member 15 permits the circulation of the heat transfer liquid 6 toward the first heat transfer liquid circulation branch 15a and toward the second heat transfer liquid circulation branch 15b, so that the heat transfer liquid 6 travels through the entire volume of the refrigerant/heat transfer liquid heat exchanger 11. These arrangements are such that an exchange surface between the refrigerant circulation paths 21a, 21b and the heat transfer liquid circulation paths 22a, 22b is as large as possible, in order to optimize the cooling of the heat transfer liquid 6, and consequently of the component 1.

In FIG. 2, the component 1 is in intermediate charging mode and requires average cooling power, less than the significant cooling power. The first control member 10 thus permits the circulation of the refrigerant 4 toward the first refrigerant circulation branch 10a and prohibits the circulation of the refrigerant 4 toward the second refrigerant circulation branch 10b, so that the refrigerant 4 travels through the first heat exchange block 41 of the refrigerant/heat transfer liquid heat exchanger 11 only. Likewise, the second control member 15 permits the circulation of the heat transfer liquid 6 toward the first heat transfer liquid circulation branch 15a and prohibits the circulation of the heat transfer liquid 6 toward the second heat transfer liquid circulation branch 15b, so that the heat transfer liquid 6 travels through the first heat exchange block 41 of the refrigerant/heat transfer liquid heat exchanger 11 only. These arrangements are such that an exchange surface between the refrigerant circulation paths 21a, 21b and the heat transfer liquid circulation paths 22a, 22b is average, in order to cool the heat transfer liquid 6 according to the cooling requirement of the component 1, which is less than when it is in rapid charging mode.

In FIG. 3, the component 1 is in normal charging mode and requires low cooling power, less than the significant and average cooling powers. The first control member 10 thus prohibits the circulation of the refrigerant 4 toward the first refrigerant circulation branch 10a and permits the circulation of the refrigerant 4 toward the second refrigerant circulation branch 10b, so that the refrigerant 4 travels through the second heat exchange block 42 of the refrigerant/heat transfer liquid heat exchanger 11 only. Likewise, the second control member 15 prohibits the circulation of the heat transfer liquid 6 toward the first heat transfer liquid circulation branch 15a and permits the circulation of the heat transfer liquid 6 toward the second heat transfer liquid circulation branch 15b, so that the heat transfer liquid 6 travels through the second heat exchange block 42 of the refrigerant/heat transfer liquid heat exchanger 11 only. These arrangements are such that an exchange surface between the refrigerant circulation paths 21a, 21b and the heat transfer liquid circulation paths 22a, 22b is minimal, in order to cool the heat transfer liquid 6 according to the cooling requirement of the component 1, which is less than when it is in rapid or intermediate charging mode.

These arrangements are such that the refrigerant/heat transfer liquid heat exchanger 11 configured in this way and associated with the first control member 10 and the second control member 15 is capable of efficiently and rapidly supplying the appropriate cooling power as a function of the operating modes of the component 1.

In FIGS. 4 and 5, the refrigerant/heat transfer liquid heat exchanger 11 is shown schematically in an orthonormal frame of reference Oxyz related to the refrigerant/heat transfer liquid heat exchanger 11, in which a direction Ox is a longitudinal direction, a direction Oy is a lateral direction and a direction Oz is a vertical direction. The refrigerant/heat transfer liquid heat exchanger 11 is generally parallelepipedal and extends longitudinally between the first cheek 23 and the second cheek 24 which longitudinally border the refrigerant/heat transfer liquid heat exchanger 11 and which each extend mainly inside a plane parallel to the plane Oyz.

The first cheek 23 is provided with four passages, including a first passage 31, a second passage 32, a third passage 33 and a fourth passage 34, which are preferably circular. It is understood that the first passage 31, the second passage 32, the third passage 33 and the fourth passage 34 are for example each formed of an orifice to allow circulation of the refrigerant 4 and/or of the heat transfer liquid 6 through the first cheek 23.

The first passage 31 and the second passage 32 are aligned in a direction parallel to the direction Oy and are situated near a first side 25 of the refrigerant/heat transfer liquid heat exchanger 11, parallel to the plane Oxy. The first passage 31 is situated near a first flank 26 of the refrigerant/heat transfer liquid heat exchanger 11, the first flank 26 extending in a plane parallel to the plane Oxz. The second passage 32 is situated near a second flank 27 of the refrigerant/heat transfer liquid heat exchanger 11, the second flank 27 extending in a plane parallel to the plane Oxz. The first flank 26 and the second flank 27 laterally border the refrigerant/heat transfer liquid heat exchanger in.

The third passage 33 and the fourth passage 34 are aligned in a direction parallel to the direction Oy and are situated near a second side 28 of the refrigerant/heat transfer liquid heat exchanger 11, parallel to the plane Oxy. The second side 28 and the first side 25 vertically border the refrigerant/heat transfer liquid heat exchanger 11. The third passage 33 is situated near the first flank 26 of the refrigerant/heat transfer liquid heat exchanger 11. The fourth passage 34 is situated near the second flank 27 of the refrigerant/heat transfer liquid heat exchanger 11.

The first passage 31, the second passage 32, the third passage 33 and the fourth passage 34 are arranged at respective angles of the first cheek 23, which is generally rectangular.

In FIG. 5 more particularly, the second cheek 24 is provided with four passages, including a fifth passage 35, a sixth passage 36, a seventh passage 37 and an eighth passage 38, which are preferably circular. It is understood that the fifth passage 35, the sixth passage 36, the seventh passage 37 and the eighth passage 38 are for example each formed of an orifice to allow circulation of the refrigerant 4 and/or of the heat transfer liquid 6 through the second cheek 24.

The fifth passage 35 and the sixth passage 36 are aligned in a direction parallel to the direction Oy and are situated near a first side 25 of the refrigerant/heat transfer liquid heat exchanger 11, parallel to the Oxy plane. The fifth passage 35 is situated near the first flank 26 of the refrigerant/heat transfer liquid 11 heat exchanger. The sixth passage 36 is situated near the second flank 27 of the refrigerant/heat transfer liquid heat exchanger 11.

The seventh passage 37 and the eighth passage 38 are aligned in a direction parallel to the direction Oy and are situated near the second side 28 of the refrigerant/heat transfer liquid heat exchanger 11. The seventh passage 37 is situated near the first flank 26 of the refrigerant/heat transfer liquid heat exchanger 11. The eighth passage 38 is situated near the second flank 27 of the refrigerant/heat transfer liquid heat exchanger 11.

The fifth passage 35, the sixth passage 36, the seventh passage 37 and the eighth passage 38 are arranged at respective angles of the second cheek 24, which is generally rectangular and of substantially identical shape to that of the first cheek 23.

Preferably, the first passage 31 and the fifth passage 35 are aligned in a direction parallel to the direction Ox, the second passage 32 and the sixth passage 36 are aligned in a direction parallel to the direction Ox, the third passage 33 and the seventh passage 37 are aligned in a direction parallel to the direction Ox, and the fourth passage 34 and the eighth passage 38 are aligned in a direction parallel to the direction Ox.

The first exchange block 41 is generally parallelepiped and extends along a first block height X1 taken between the first side 25 and the second side 28 parallel to the axis Oz. The first exchange block 41 extends along a first block length X2 taken between the first cheek 23 and the partition plate 40 parallel to the axis Ox. The first exchange block 41 extends along a first block width X3 taken between the first flank 26 and the second flank 27 parallel to the axis Oy.

The second exchange block 42 is generally parallelepiped and extends along a second block height X4 taken between the first side 25 and the second side 28 parallel to the axis Oz. The first exchange block 41 extends along a second block length X5 taken between the partition plate 40 and the second cheek 24 parallel to the axis Ox. The first exchange block 41 extends along a second block width X6 taken between the first flank 26 and the second flank 27 parallel to the axis Oy.

Preferably, the first block height X1 and the second block height X4 are equal, to within the manufacturing tolerances, the first block length X2 is twice the second block length X5, to within the manufacturing tolerances, and the first block width X3 and the second block width X6 are equal, to within the manufacturing tolerances.

In FIG. 6, the partition plate 40 is generally rectangular. The partition plate 40 extends between a first lateral rim 40a and a second lateral rim 40b which are parallel to the axis Oz, and extends between a first transverse rim 40c and a second transverse rim 40d which are parallel to the axis Oy. The partition plate 40 extends along a plate height X7 taken between the first transverse rim 40c and the second transverse rim 40d parallel to the axis Oz. The partition plate 40 extends along a plate width X8 taken between the first lateral rim 40a and the second lateral rim 40b parallel to the axis Oy.

The plate height X7 is strictly greater than the first block height X1 and the second block height X4, so that the partition plate 40 emerges beyond the first side 25 and the second side 28. In other words, the partition plate 40 comprises a first region 40e which overhangs the first side 25 and a second region 40f which overhangs the second side 28.

The plate width X8 is strictly greater than the first block width X3 and the second block width X6, such that the partition plate 40 emerges beyond the first flank 26 and the second flank 27. In other words, the partition plate 40 comprises a third region 40g which overhangs the first flank 26 and a fourth region 40h which overhangs the second flank 27.

The partition plate 40 is provided with fixing means 43 which equip any one at least of the regions 40e, 40f, 40g, 40h that the partition plate 40 comprises. The fixing means 43 are intended to allow installation of the refrigerant/heat transfer liquid heat exchanger 11 on a support that the motor vehicle comprises, such as an element of a chassis of the motor vehicle or the like. Preferably, the fixing means 43 comprise at least one opening 44, and preferably four openings 44 distributed at the corners of the partition plate 40, these openings 44 being suitable for receiving fixing bolts or the like.

In FIGS. 6 and 7, the partition plate 40 is provided with centering means 45 for centering the first heat exchange block 41 and the second heat exchange block 42. The centering means 45 are intended to position the first heat exchange block 41 and the second heat exchange block 42 on either side of the partition plate, forming the regions 40e, 40f, 40g, 40h, which jointly border and surround the first heat exchange block 41 and the second heat exchange block 42. The centering means 45 comprise a plurality of bosses 46 which are distributed over each of the faces 47 of the partition plate 40. The bosses 46 are preferably distributed at the edge of the regions 40e, 40f, 40g, 40h of the partition plate which the bosses 46 at least partially delimit. Each boss 46 is for example arranged substantially in a half-ovoid, in particular obtained by stamping the partition plate 40. Each boss 46 comprises an apex 48 which is intended to come into contact against the first heat exchange block 41 or the second heat exchange block 42, in order to be brazed therewith.

The refrigerant/heat transfer liquid heat exchanger 11 is a plate exchanger which comprises the first cheek 23, the second cheek 24, the partition plate 40 and a plurality of first-type exchange plates 105a, such as the first-type exchange plate 105a illustrated in FIG. 8, or else a plurality of second-type exchange plates 105b, such as the second-type exchange plate 105b illustrated in FIG. 9.

In FIGS. 8 and 9, each exchange plate 105a, 105b, equally first-type exchange plate 105a illustrated in FIG. 8 or else second-type exchange plate 105b illustrated in FIG. 9, extends mainly along an axis of elongation A1. Each exchange plate 105a, 105b comprises a bottom 106 and at least one raised edge 107 which surrounds the bottom 106. In other words, the raised edge 107 is formed on the periphery of the bottom 106, which extends inside a bottom plane P1, and the raised edge 107 surrounds the bottom 106. It will be understood that each exchange plate 105a, 105b is arranged as a generally rectangular bathtub, the bottom of the bathtub consisting of the bottom 106 and the edges of the bathtub consisting of the raised edge 107. More particularly, the raised edge 107 comprises two lateral raised edges 108a, 108b which are formed opposite each other, and two transverse raised edges 109a, 109b which are formed opposite each other.

Each exchange plate 105a, 105b comprises four orifices 110, in particular circular orifices, which are distributed in pairs at each transverse end of the first-type exchange plate 105a, and more particularly at each of the corners of the bottom 106 of the exchange plate 105a, 105b. Two of these orifices 110 are configured to communicate with one of the circulation paths 21a, 21b, 22a, 22b formed on one side of the bottom 106 and the other two orifices 110 are configured to communicate with one of the circulation paths 21a, 21b, 22a, 22b formed on another side of the bottom 106.

The bottom 106 is provided with a plurality of protuberances 112 to disturb a circulation of the refrigerant 4 or of the heat transfer liquid 6 and to improve heat exchange between the refrigerant 4 and the heat transfer liquid 6.

To form the first heat exchange block 41 or the second heat exchange block 42, a plurality of exchange plates 105a, 105b are nested one inside the other and in contact with one another at least via their raised edges 107. In other words, two exchange plates 105a, 105b are stacked one above the other and form between them a space which forms the circulation channel 211a, 211b, 221a, 221b for the refrigerant 4 or for the heat transfer liquid 6.

In FIG. 8, which illustrates the first-type exchange plate 105a, two of the orifices no formed at the same transverse end of the first-type exchange plate 105a are each surrounded by a collar 120, so that these orifices 110 surrounded by this collar 120 extend in a plane offset from the bottom plane P1, parallel to the plane Oyz, in which the bottom 106 is inscribed. The other two orifices no situated at the other transverse end of the first-type plate 105a extend in the bottom plane P1.

The bottom 106 comprises a rib 113 which is arranged so that the circulation channel 211a, 211b, 221a, 221b has a U-shaped profile. The rib 113 is parallel to a direction D of elongation of the raised lateral edges 108a, 108b, the direction D of elongation of the raised lateral edges 108a, 108b being preferably parallel to the axis of elongation A1 of the first-type exchange plate 105a. The rib 113 extends between a first end 114 and a second end 115, the first end 114 being in contact with the raised edge 107, and preferably in contact with a first transverse raised edge 109a which the raised edge 107 comprises. The second end 115 is situated at a first non-zero distance D1 from the raised edge 107, the first distance D1 being taken along the axis of elongation A1 between the second end 115 and a second transverse raised edge 109b, opposite the first transverse raised edge 109a.

These arrangements are such that the circulation channel 211a, 211b, 221a, 221b is shaped in a "U" whose branches of the "U" are parallel to the raised lateral edges 108a, 108b of the first-type exchange plate 105a and are separated by the rib 113, and the base of the "U" of which adjoins the second transverse edge 109b. The rib 113 is formed at an equal second distance D2 from the two lateral edges 108a, 108b of the first-type exchange plate 105a, the second distance D2 being measured between the rib 113, taken at its center, and one of the raised lateral edges 108a, 108b, perpendicular to the axis of elongation A1 of the first-type exchange plate 105a.

It follows from these arrangements that the refrigerant/heat transfer liquid heat exchanger 11 obtained from such first-type exchange plates 105a is illustrated in FIG. 10. In this case, the first passage 31 and the second passage 32 form an integral part of the first refrigerant circulation path 21a, which is shown in bold and continuous lines. The first passage 31 is for example an intake of the refrigerant 4 inside the first heat exchange block 41 of the refrigerant/heat transfer liquid heat exchanger 11, while the second passage 32 is a discharge of the refrigerant 4 outside the first heat exchange block 41 of the refrigerant/heat transfer liquid heat exchanger 11. The third passage 34 and the fourth passage 34 form an integral part of the first heat transfer liquid circulation path 22a, which is shown in bold and dotted lines. The third passage 34 is for example an intake of the heat transfer liquid 6 inside the first heat exchange block 41 of the refrigerant/heat transfer liquid heat exchanger 11, while the fourth passage 34 is a discharge of the heat transfer liquid 6 outside the first heat exchange block 41 of the refrigerant/heat transfer liquid heat exchanger 11. It is understood in this that inside the first heat exchange block 41, the first circulation path for the refrigerant 21a is arranged in a "U" and that the first circulation path for the heat transfer liquid 22a is also arranged in a "U".

The fifth passage 35 and the sixth passage 36 form an integral part of the second circulation path for the refrigerant 21b, which is shown in bold and solid lines. The fifth passage 35 is for example an intake of the refrigerant 4 inside the second heat exchange block 42 of the refrigerant/heat transfer liquid heat exchanger 11, while the sixth passage 36 is a discharge of the refrigerant 4 outside the second heat exchange block 42 of the refrigerant/heat transfer liquid heat exchanger 11. The seventh passage 37 and the eighth passage 38 form an integral part of the second circulation path for the heat transfer liquid 22b, which is shown in bold and dotted lines. The seventh passage 37 is for example an intake of the heat transfer liquid 6 inside the second heat exchange block 42 of the refrigerant/heat transfer liquid heat exchanger 11, while the eighth passage 38 is a discharge of the heat transfer liquid 6 outside the second heat exchange block 42 of the refrigerant/heat transfer liquid heat exchanger 11. It is understood in this that inside the second heat exchange block 42, the second circulation path for the refrigerant 21b is arranged in a "U" and that the second circulation path for the heat transfer liquid 22b is also arranged in a "U".

In FIG. 9, which illustrates the second-type exchange plate 105b, two of the orifices 110 formed along a diagonal D3 of the second-type exchange plate 105b are surrounded by a collar 120, so that these orifices 110 surrounded by this collar 120 extend in a plane offset from the bottom plane P1, parallel to the plane Oyz, in which the bottom 106 is inscribed. The other two orifices 110 situated along the other diagonal of the second-type exchange plate 105b extend in the bottom plane P1. These arrangements are such that the circulation channel 2n1a, 211b, 221a, 221b is shaped as an "I".

It follows from these arrangements that the refrigerant/heat transfer liquid heat exchanger 11 obtained from such second-type exchange plates 105b is illustrated in FIG. 11. In this case, the first passage 31 and the fourth passage 34 form an integral part of the first circulation path for the refrigerant 21a, which is shown in bold and continuous lines. The first passage 31 is for example an intake of the refrigerant 4 inside the first heat exchange block 41 of the refrigerant/heat transfer liquid heat exchanger 11, while the fourth passage 34 is a discharge of the refrigerant 4 outside the first heat exchange block 41 of the refrigerant/heat transfer liquid heat exchanger 11. The second passage 32 and the third passage 33 form an integral part of the first circulation path for the heat transfer liquid 22a, which is shown in bold and dotted lines. The second passage 32 is for example an intake of the heat transfer liquid 6 inside the first heat exchange block 41 of the refrigerant/heat transfer liquid heat exchanger 11, while the third passage 33 is a discharge of the heat transfer liquid 6 outside the first heat exchange block 41 of the refrigerant/heat transfer liquid heat exchanger 11. It is understood in this that inside the first heat exchange block 41, the first circulation path for the refrigerant 21a is arranged in an "I" and that the first circulation path for the heat transfer liquid 22a is also arranged in an "I".

The fifth passage 35 and the eighth passage 38 form an integral part of the second circulation path for the refrigerant 21b, which is shown in bold and solid lines. The fifth passage 35 is for example an intake of the refrigerant 4 inside the second heat exchange block 42 of the refrigerant/ heat transfer liquid heat exchanger 11, while the eighth passage 38 is a discharge of the refrigerant 4 outside the second heat exchange block 42 of the refrigerant/heat transfer liquid heat exchanger 11. The sixth passage 36 and the seventh passage 37 form an integral part of the second circulation path for the heat transfer liquid 22b, which is shown in bold and dotted lines. The sixth passage 36 is for example an intake of the heat transfer liquid 6 inside the second heat exchange block 42 of the refrigerant/heat transfer liquid heat exchanger 11, while the seventh passage 37 is a discharge of the heat transfer liquid 6 outside the second heat exchange block 42 of the refrigerant/heat transfer liquid heat exchanger 11. It is understood in this that inside the second heat exchange block 42, the second circulation path for the refrigerant 21b is arranged in an "I" and that the second circulation path for the heat transfer liquid 22b is also arranged in an "I".

According to one embodiment of the present invention, the first heat exchange block 41 and/or the second heat exchange block 42 comprises an end plate 49 which is interposed between the partition plate 40 and the exchange plate 105a, 105b furthest from the cheek 23, 24 such as the end plate shown in FIG. 12. The end plate 49 is similar to an exchange plate, with the notable exception that the end plate 49 is free of an orifice 110, protuberance 112 and groove 113. The end plate 49 is, however, shaped like a cup and has a raised edge 107 which surrounds a bottom 106. The raised edge 107 of the end plate 49 is intended in particular to come into abutment against the bosses 46 of the partition plate 40. The bottom 106 of the end plate 49 is in particular intended to come into contact with the apex 48 of each boss 46 to allow these elements to be brazed together.

All of these arrangements are such that a cooling method according to the present invention for cooling the component 1 by means of the installation 2 described above allows the component 1 to be cooled, according to three appropriate modes, depending on the state of charge of the electrical storage device 1, and in particular from a choice of activation of the first control member 10 and/or the second control member 15 in which:
- the refrigerant 4 and the heat transfer liquid 6 travel through the first heat exchange block 41 and the second heat exchange block 42 when the component 1 is placed in a rapid charging mode, and
- the refrigerant and the heat transfer liquid 6 travel through only the first heat exchange block 41 when the component 1 is placed in an intermediate charging mode,
- the refrigerant and the heat transfer liquid 6 travel through only the second heat exchange block 42 when the component 1 is placed in a normal charging mode.

The invention claimed is:

1. A refrigerant/heat transfer liquid heat exchanger in which the refrigerant/heat transfer liquid heat exchanger is a monoblock refrigerant/heat transfer liquid heat exchanger comprising:
at least two heat exchange blocks sealed with respect to one another, including a first heat exchange block comprising a first refrigerant circulation path for a refrigerant and a first heat transfer liquid circulation path for a heat transfer liquid, and a second heat exchange block comprising a second refrigerant circulation path for the refrigerant and a second heat transfer liquid circulation path for the heat transfer liquid,
a partition plate configured to join the heat exchange blocks and fluidically isolate the first heat exchange block from the second heat exchange block,
wherein the partition plate further comprises a first region that emerges beyond a first flank of the refrigerant/heat transfer liquid heat exchanger and a second region that emerges beyond a second flank of the refrigerant/heat transfer liquid heat exchanger such that the first region and the second region overhang the first flank and the second flank, respectively, and
wherein the first region and the second region each comprise at least one opening configured to receive a bolt that attaches the refrigerant/heat transfer liquid heat exchanger to a support of a motor vehicle.

2. The refrigerant/heat transfer liquid heat exchanger as claimed in claim 1, wherein the first heat exchange block and the second heat exchange block are butted longitudinally via the partition plate.

3. The refrigerant/heat transfer liquid heat exchanger as claimed in claim 1, wherein the partition plate is equipped with a plurality of bosses configured to center the first heat exchange block and the second heat exchange block on the partition plate.

4. The refrigerant/heat transfer liquid heat exchanger as claimed in claim 1, wherein the refrigerant/heat transfer liquid heat exchanger extends longitudinally between a first cheek and a second cheek, the first cheek being provided with four passages, including a first passage, a second passage, a third passage and a fourth passage, and the second cheek being provided with four passages, including a fifth passage, a sixth passage, a seventh passage and an eighth passage.

5. The refrigerant/heat transfer liquid heat exchanger as claimed in claim 4, wherein the first passage and the second passage constitute the first refrigerant circulation path for the refrigerant, the third passage and the fourth passage constitute the first heat transfer liquid circulation path for the heat transfer liquid, the fifth passage and the sixth passage constitute the second refrigerant circulation path for the refrigerant, and the seventh passage and the eighth passage constitute the second heat transfer liquid circulation path for the heat transfer liquid.

6. The refrigerant/heat transfer liquid heat exchanger as claimed in claim 4, wherein the first passage and the fourth passage constitute the first refrigerant circulation path for the refrigerant, the second passage and the third passage constitute the first heat transfer liquid circulation path for the heat transfer liquid, the fifth passage and the eighth passage constitute the second refrigerant circulation path for the refrigerant, and the sixth passage and the seventh passage constitute the second heat transfer liquid circulation path for the heat transfer liquid.

7. The refrigerant/heat transfer liquid heat exchanger as claimed in claim 1, wherein the refrigerant/heat transfer liquid heat exchanger is a plate exchanger comprising the partition plate and exchange plates which are assembled together by brazing.

8. The refrigerant/heat transfer liquid heat exchanger as claimed in claim 1, wherein exchange plates constituting the first heat exchange block are identical to exchange plates constituting the second heat exchange block.

9. An installation for thermal treatment of a component equipping a motor vehicle, the installation comprising:
a refrigerant circuit;
a heat transfer liquid circuit; and
the refrigerant/heat transfer liquid heat exchanger as claimed in claim 7, the refrigerant circuit comprising a first refrigerant circulation branch and a second refrigerant circulation branch that are arranged parallel to each other, the heat transfer liquid circuit comprising a first heat transfer liquid circulation branch and a second heat transfer liquid circulation branch that are arranged parallel to each other, wherein the first refrigerant circulation path constitutes the first refrigerant circulation branch, the first heat transfer liquid circulation path constitutes the first heat transfer liquid circulation branch, the second refrigerant circulation path constitutes the second refrigerant circulation branch and the second heat transfer liquid circulation path constitutes the second heat transfer liquid circulation branch.

10. A method of cooling an electrical storage device of a motor vehicle by an installation as claimed in claim 9, wherein:

the refrigerant and the heat transfer liquid travel through the first heat exchange block and the second heat exchange block when the electrical storage device is in a rapid charging mode;

the refrigerant and the heat transfer liquid travel through only the first heat exchange block when the electrical storage device is in an intermediate charging mode; and the refrigerant and the heat transfer liquid travel through only the second heat exchange block when the electrical storage device is in a normal charging mode.

* * * * *